(12) United States Patent
Humes et al.

(10) Patent No.: US 11,982,193 B1
(45) Date of Patent: May 14, 2024

(54) SYSTEMS AND METHODS FOR MULTI-DIMENSIONAL VARIABLE VANE STAGE RIGGING UTILIZING ADJUSTABLE INCLINED MECHANISMS

(71) Applicant: Rolls-Royce North American Technologies Inc., Indianapolis, IN (US)

(72) Inventors: Ryan Humes, Indianapolis, IN (US); Andrew Eifert, Indianapolis, IN (US); Paulo Bazan, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/091,913

(22) Filed: Dec. 30, 2022

(51) Int. Cl.
*F01D 17/16* (2006.01)
*F02C 9/22* (2006.01)

(52) U.S. Cl.
CPC .............. *F01D 17/162* (2013.01); *F02C 9/22* (2013.01); *F05D 2220/32* (2013.01); *F05D 2230/60* (2013.01); *F05D 2240/12* (2013.01); *F05D 2260/60* (2013.01)

(58) Field of Classification Search
CPC ........ F01D 17/162; F01D 17/16; F01D 9/041; F01D 9/042; F01D 17/14; F01D 9/04; F01D 17/12; F01D 25/34; F01D 17/165; F01D 25/16; F01D 25/243; F01D 25/28; F01D 7/00; F04D 29/563; F04D 27/0246; F04D 27/002; F04D 29/644; F04D 29/321; F04D 29/323; F05D 2220/32; F05D 2260/56; F05D 2260/50; F05D 2240/12; F05D 2240/128; F05D 2260/53; F05D 2260/74; F05D 2250/90; F05D 2250/14; F05D 2230/64; F05D 2230/60; F05D 2260/36; F05D 2260/532; F05D 2260/60; F05D 2260/70; F05D 2250/294; F05B 2260/50; F02C 9/22
See application file for complete search history.

(56) References Cited

U.S. PATENT DOCUMENTS

| | | | |
|---|---|---|---|
| 3,914,066 | A | 10/1975 | Downing |
| 5,492,446 | A | 2/1996 | Hawkins et al. |
| 5,692,879 | A | 12/1997 | Charbonnel |
| 5,807,072 | A | 9/1998 | Payling |
| 5,993,152 | A | 11/1999 | Schilling |
| 6,769,868 | B2 | 8/2004 | Harrold |

(Continued)

*Primary Examiner* — Eric J Zamora Alvarez
(74) *Attorney, Agent, or Firm* — Barnes & Thornburg LLP

(57) ABSTRACT

A vane adjustment assembly includes a plurality of vanes, an annular ring coupled to the vanes, and a ring adjustment assembly. The ring adjustment assembly includes a first inclined plate and a second inclined plate, the first inclined plate having an inclined surface facing a first inclined surface of the second inclined plate. A roller pin is coupled to a second inclined surface of the second inclined plate opposite the first inclined surface. The second inclined plate is adjustable in the circumferential direction such that the inclined surface of the first inclined plate and the first inclined surface of the second inclined plate slide against each other during adjustment of the second inclined plate so as to adjust an axial position and a circumferential position of the roller pin relative to the annular ring.

20 Claims, 18 Drawing Sheets

(56) References Cited

U.S. PATENT DOCUMENTS

| | | | |
|---|---|---|---|
| 7,112,041 B2* | 9/2006 | Debeneix | F01D 17/162 |
| | | | 415/162 |
| 7,413,401 B2* | 8/2008 | Szucs | F01D 17/162 |
| | | | 415/162 |
| 8,177,490 B2* | 5/2012 | Bouru | F01D 17/162 |
| | | | 415/150 |
| 8,297,918 B2 | 10/2012 | Bhatnagar | |
| 8,333,546 B2 | 12/2012 | Colotte et al. | |
| 8,393,857 B2 | 3/2013 | Copeland et al. | |
| 8,727,697 B2* | 5/2014 | Eifert | F04D 29/563 |
| | | | 415/1 |
| 8,784,043 B2* | 7/2014 | Bouru | F04D 29/563 |
| | | | 92/128 |
| 9,091,209 B2* | 7/2015 | LeBlanc | F01D 17/162 |
| 9,353,643 B2 | 5/2016 | Major | |
| 9,429,169 B2* | 8/2016 | Bouru | F04D 29/563 |
| 9,645,050 B2 | 5/2017 | Allford | |
| 10,100,663 B2 | 10/2018 | Longworth et al. | |
| 10,107,130 B2* | 10/2018 | Suciu | F01D 17/162 |
| 10,196,925 B2 | 2/2019 | Siebert | |
| 10,288,079 B2 | 5/2019 | Skertic | |
| 10,301,962 B2 | 5/2019 | Chandler et al. | |
| 10,352,187 B2 | 7/2019 | Keenan | |
| 10,364,828 B2 | 7/2019 | Ikeguchi et al. | |
| 10,393,145 B2 | 8/2019 | Medina Cruz et al. | |
| 10,443,431 B2 | 10/2019 | Suciu et al. | |
| 10,458,271 B2 | 10/2019 | Chandler et al. | |
| 10,508,660 B2 | 12/2019 | Hall et al. | |
| 10,563,670 B2* | 2/2020 | Dierksmeier | F04D 29/563 |
| 10,626,747 B2 | 4/2020 | Karapurath | |
| 10,634,000 B2 | 4/2020 | Skertic et al. | |
| 10,662,804 B2 | 5/2020 | Awtry et al. | |
| 10,718,230 B2* | 7/2020 | Littler | F01D 25/243 |
| 10,753,231 B2 | 8/2020 | Mena-Dominguez et al. | |
| 10,815,802 B2 | 10/2020 | Prasad | |
| 10,927,699 B2 | 2/2021 | Bromann et al. | |
| 11,105,219 B2 | 8/2021 | Ward | |
| 11,125,115 B2 | 9/2021 | Humhauser | |
| 11,131,323 B2 | 9/2021 | Suciu et al. | |
| 11,371,380 B2 | 6/2022 | Poick | |
| 11,708,767 B2* | 7/2023 | Cox | F04D 29/563 |
| | | | 415/1 |
| 2019/0093502 A1* | 3/2019 | Lyon | B23P 19/10 |
| 2020/0088108 A1 | 3/2020 | Klein et al. | |

* cited by examiner

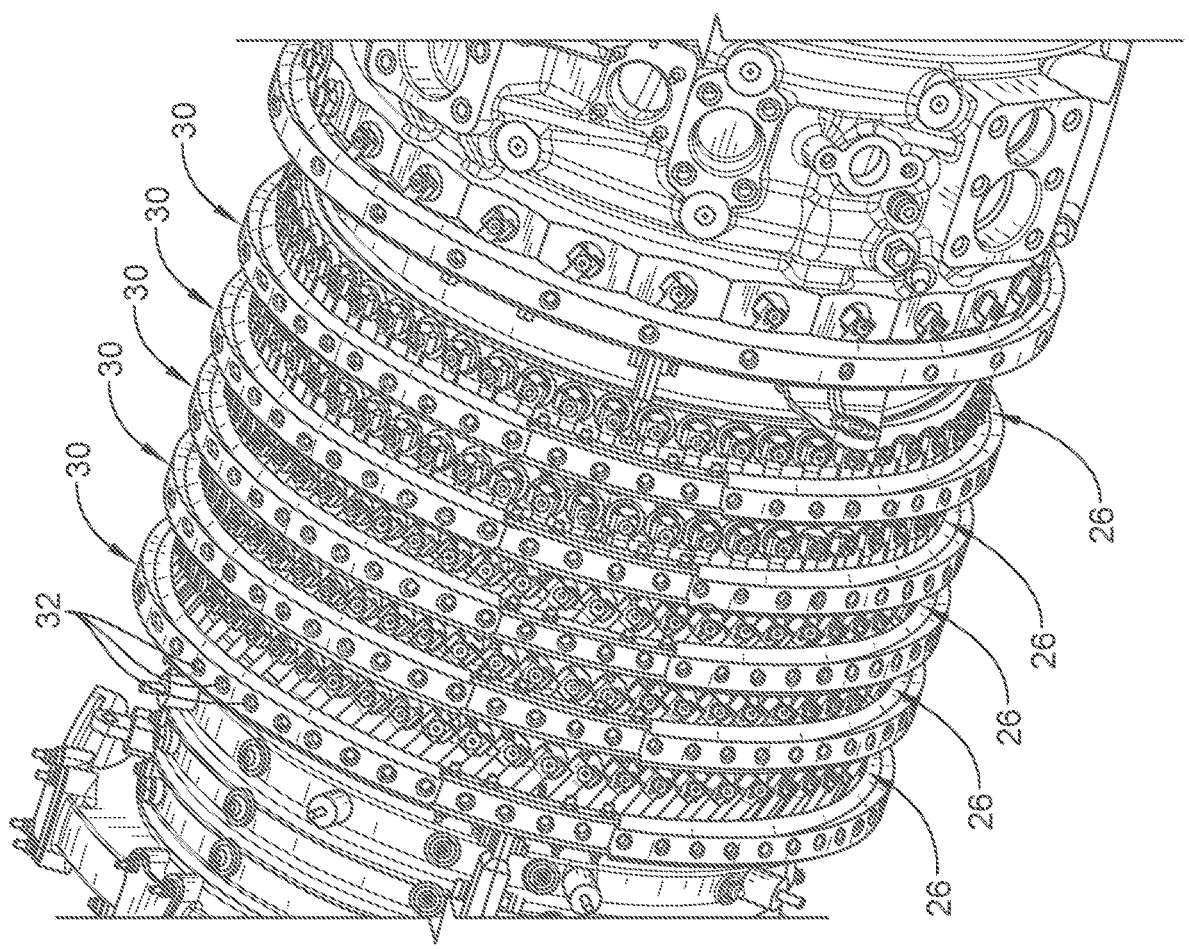

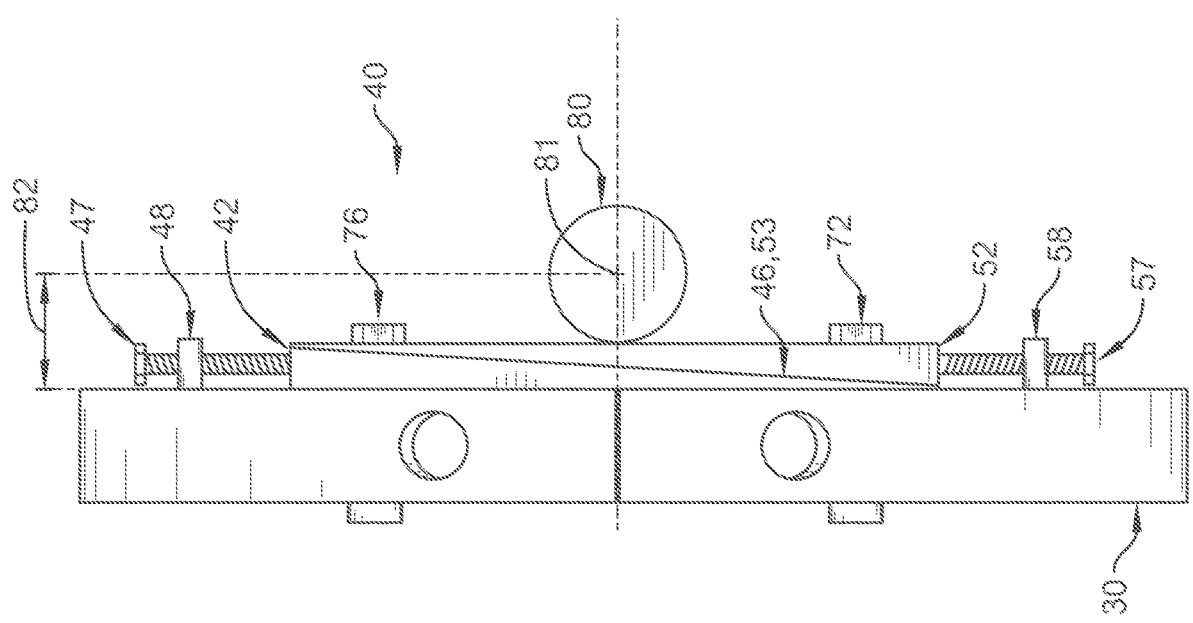

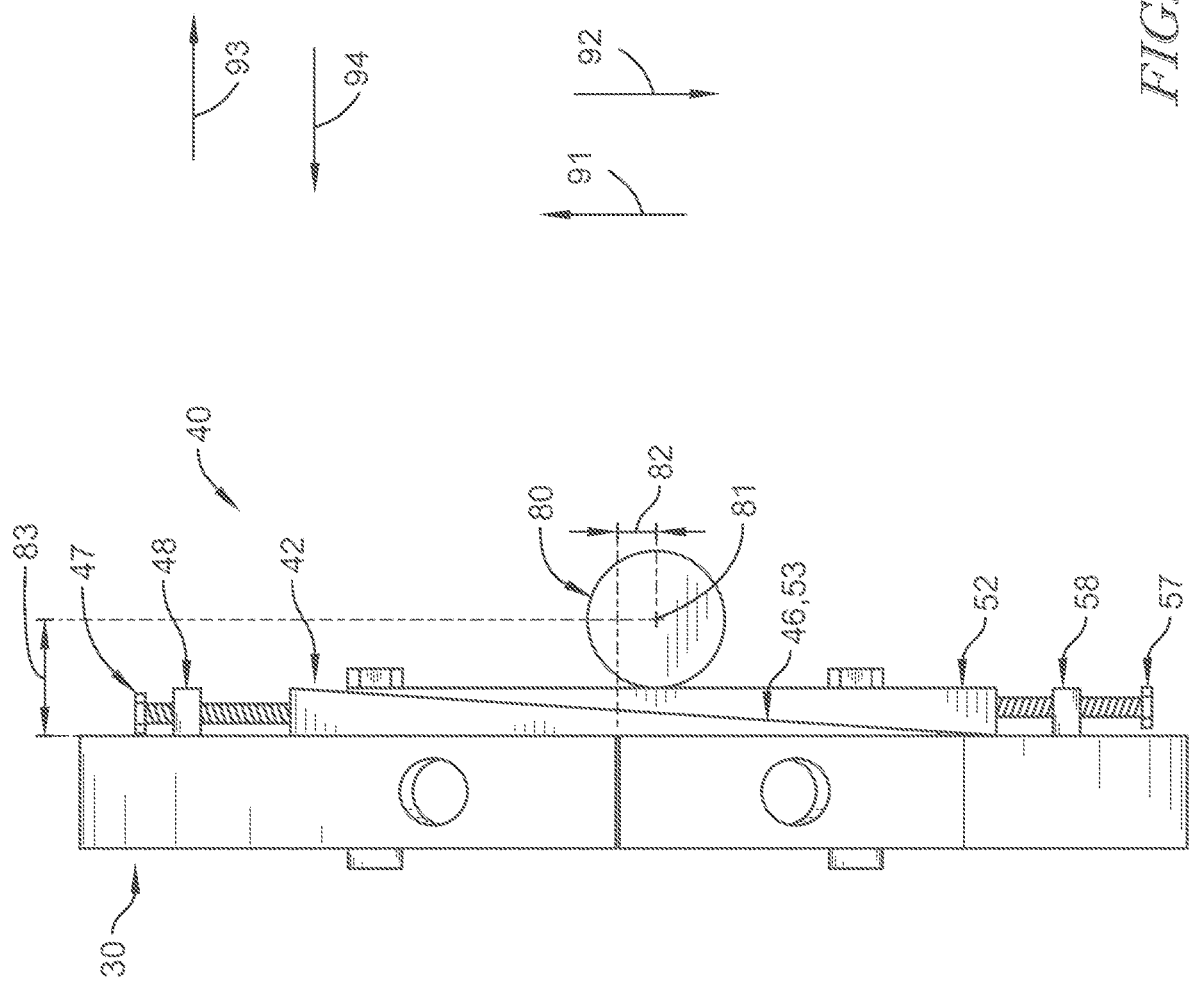

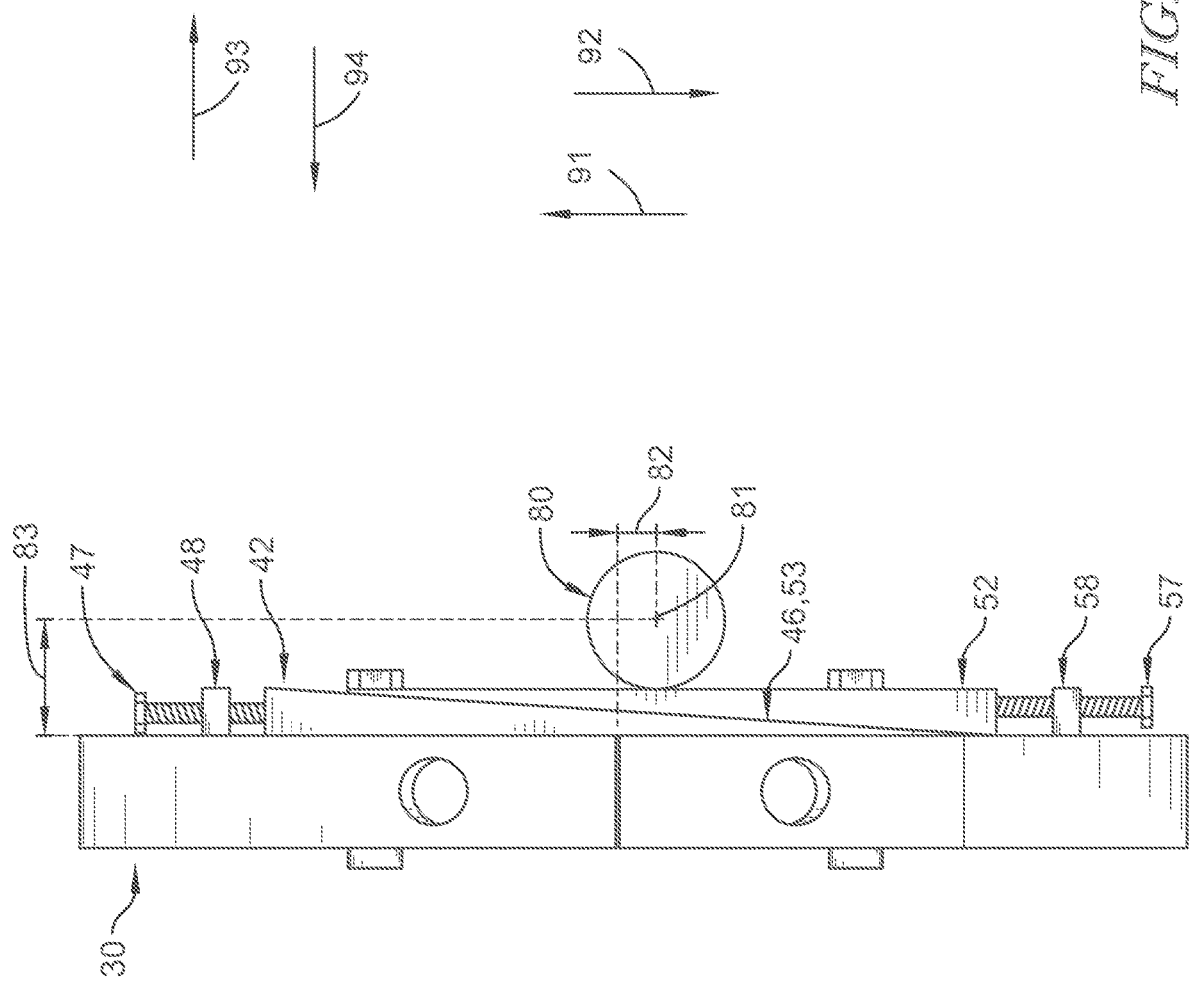

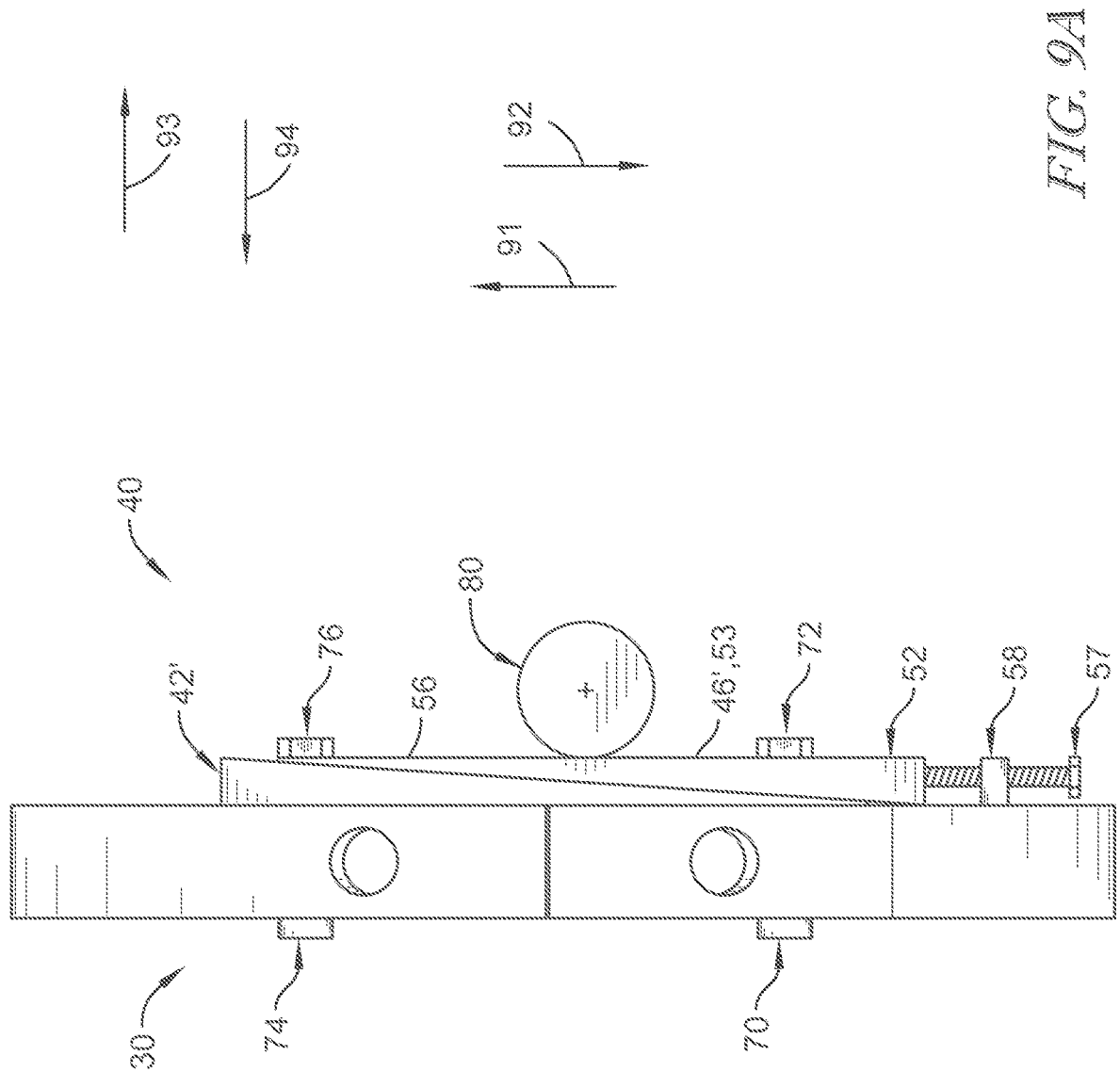

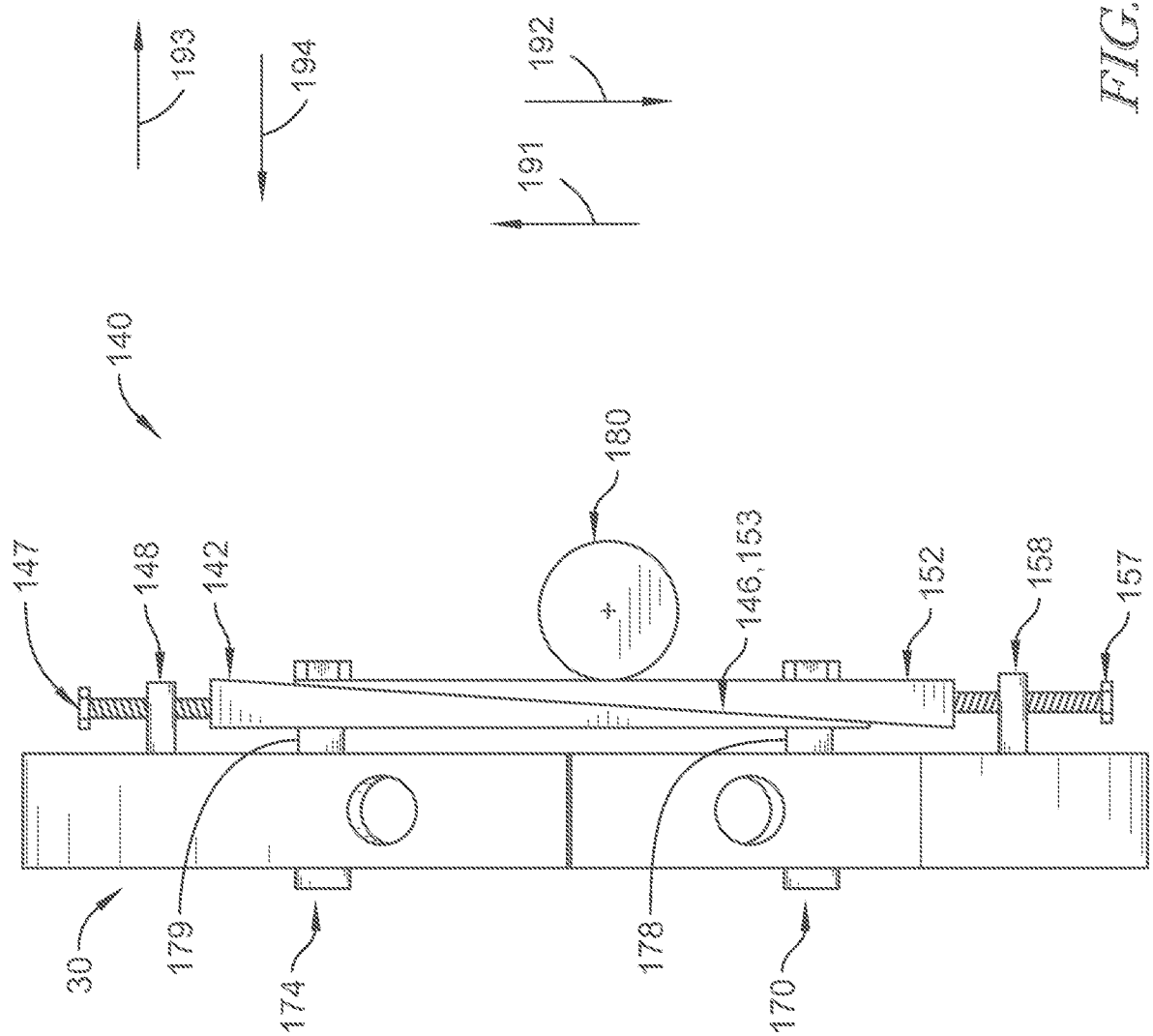

SYSTEMS AND METHODS FOR MULTI-DIMENSIONAL VARIABLE VANE STAGE RIGGING UTILIZING ADJUSTABLE INCLINED MECHANISMS

FIELD OF THE DISCLOSURE

The present disclosure relates generally to gas turbine engines, and more specifically to variable vane assemblies of gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Leftover products of the combustion are exhausted out of the turbine and may provide thrust in some applications.

Gas turbine engines also typically include vane assemblies arranged within the engine components, such as inlet guide vanes and stator vanes. To provide for the necessary stall or surge margin at different power settings throughout operation of the gas turbine engine, variable, or adjustable, vanes may be utilized, such as variable inlet guide vanes and/or variable stator vanes. It is important to position of the vanes with extreme precision in order to accurately direct airflow within the engine.

SUMMARY

The present disclosure may comprise one or more of the following features and combinations thereof.

According to a first aspect of the present disclosure, a vane adjustment assembly includes a plurality of vanes extending radially outward relative to a central axis of the gas turbine engine, an annular ring arranged radially outward of the central axis and coupled to the plurality of variable vanes, and a ring adjustment assembly. The ring adjustment assembly includes (i) a first inclined plate having a first plate surface arranged on an axially facing surface of the annular ring and a second plate surface opposite the first plate surface that is inclined in a first circumferential direction, (ii) a second inclined plate having a first plate surface arranged on the second plate surface of the first inclined plate and a second plate surface opposite the first plate surface, the first inclined plate surface of the second inclined plate being inclined in a second circumferential direction opposite the first circumferential direction, and (iii) a roller pin coupled to the second plate surface of the second inclined plate. In some embodiments, the second inclined plate is adjustable in the first and second circumferential directions such that the first plate surface of the second inclined plate is configured to slide along the second plate surface of the first inclined plate during adjustment of the second inclined plate so as to adjust an axial position and a circumferential position of the roller pin relative to the annular ring.

In some embodiments, the ring adjustment assembly further includes a first fastener extending axially through the annular ring, through the first inclined plate, and through the second inclined plate. In some embodiments, the second inclined plate includes a first elongated opening formed therethrough, the first elongated opening has a longitudinal extent that extends in a circumferential direction from a first circumferential side of the second inclined plate to a second circumferential side of the second inclined plate, and the first fastener extends through the first elongated opening.

In some embodiments, the first fastener is slidable within the first elongated opening such that the first elongated opening of the second inclined plate slides along the first fastener during adjustment of the second inclined plate in the first and second circumferential directions.

In some embodiments, the first circumferential side of the second inclined plate is thicker in an axial direction relative to the annular ring than the second circumferential side of the second inclined plate such that the second inclined plate is inclined in the second circumferential direction from the second circumferential side to the first circumferential side. In some embodiments, the annular ring includes a second plate support member extending axially away from the axially facing surface of the annular ring and that includes a threaded hole extending circumferentially therethrough. The second inclined plate includes a threaded screw extending away from the first circumferential side that extends through and engages the threaded hole of the second plate support member, and rotation of the threaded screw in a first rotational direction moves the second inclined plate in one of the first and second circumferential directions.

In some embodiments, the first inclined plate is adjustable in the first and second circumferential directions such that the second plate surface of the first inclined plate is configured to slide along the first plate surface of the second inclined plate during adjustment of the first inclined plate so as to further adjust an axial position of the roller pin relative to the annular ring. In some embodiments, a first circumferential side of the first inclined plate is thinner in an axial direction relative to the annular ring than a second circumferential side of the first inclined plate such that the second inclined plate is inclined in the first circumferential direction from the first circumferential side to the second circumferential side.

In some embodiments, the annular ring further includes a first plate support member extending axially away from the axially facing surface of the annular ring and that includes a threaded hole extending circumferentially therethrough. The first inclined plate includes a threaded screw extending away from the second circumferential side that extends through and engages the threaded hole of the first plate support member, and rotation of the threaded screw in a first rotational direction moves the first inclined plate in one of the first and second circumferential directions.

In some embodiments, the first inclined plate is fixedly coupled to the annular ring. In some embodiments, the ring adjustment assembly further includes a spacer arranged between the first inclined plate and the annular ring so as to increase an axial distance between the roller pin and the annular ring.

In some embodiments, the roller pin is selectively movably coupled to a casing of the gas turbine engine such that movement of the roller pin relative to the casing further adjusts the position of the annular ring relative to the casing, the roller pin is selectively movably coupled to the casing via a cam plate that is slidably coupled to the casing and slidable relative thereto, and the cam plate includes at least one slot within which the roller pin is slidably arranged. In some embodiments, sliding of the cam plate relative to the casing in an axial direction causes the roller pin to slidably move within the at least one slot and further adjust a position of the annular ring relative to the casing, and the roller pin includes a roller pin head configured to be slidably arranged within the at least one slot and engage with edges of the at least one slot.

According to a further aspect of the present disclosure, a vane adjustment assembly includes an annular ring arranged radially outward of a central axis of the gas turbine engine and coupled to a plurality of variable vanes and a ring adjustment assembly. The ring adjustment assembly includes (i) a first inclined plate having a first surface that is inclined in a first circumferential direction, (ii) a second inclined plate having a second surface facing the first surface that is inclined in a second circumferential direction opposite the first circumferential direction, and (iii) a roller pin coupled to the second inclined plate. In some embodiments, the second inclined plate is adjustable in the first and second circumferential directions such that the first surface is configured to slide along the second surface during adjustment of the second inclined plate so as to adjust an axial position and a circumferential position of the roller pin relative to the annular ring.

In some embodiments, the ring adjustment assembly further includes a first fastener extending axially through the annular ring, through the first inclined plate, and through the second inclined plate. In some embodiments, the second inclined plate includes a first elongated opening formed therethrough, the first elongated opening has a longitudinal extent that extends in a circumferential direction from a first circumferential side of the second inclined plate to a second circumferential side of the second inclined plate, and the first fastener extends through the first elongated opening.

In some embodiments, the first fastener is slidable within the first elongated opening such that the first elongated opening of the second inclined plate slides along the first fastener during adjustment of the second inclined plate in the first and second circumferential directions. In some embodiments, the first circumferential side of the second inclined plate is thicker in an axial direction relative to the annular ring than the second circumferential side of the second inclined plate such that the second inclined plate is inclined in the second circumferential direction from the second circumferential side to the first circumferential side.

In some embodiments, the annular ring includes a second plate support member extending axially away from an axially facing surface of the annular ring and that includes a threaded hole extending circumferentially therethrough, the second inclined plate includes a threaded screw extending away from the first circumferential side that extends through and engages the threaded hole of the second plate support member, and rotation of the threaded screw in a first rotational direction moves the second inclined plate in one of the first and second circumferential direction.

According to a further aspect of the present disclosure, a method of adjusting a position of a plurality of variable vanes of a gas turbine engine arranging the plurality of variable vanes around a central axis of the gas turbine engine, arranging an annular ring radially outward of the central axis, and coupling the annular ring to the plurality of variable vanes. The method can further include arranging a first inclined plate having a first surface that is inclined in a first circumferential direction on an axial surface of the annular ring, and arranging a second inclined plate on the first surface of the first inclined plate, the second inclined plate having a second surface contacting the first surface that is inclined in a second circumferential direction opposite the first circumferential direction, the second inclined plate including a roller pin coupled thereto. In some embodiments, the second inclined plate is adjustable in the first and second circumferential directions such that the first surface is configured to slide along the second surface during adjustment of the second inclined plate so as to adjust an axial position and a circumferential position of the roller pin relative to the annular ring.

These and other features of the present disclosure will become more apparent from the following description of the illustrative embodiments.

BRIEF DESCRIPTION OF THE DRAWINGS

FIG. 3A is a perspective view of a compressor section of the engine of FIG. 1, showing that the engine includes multiple annular rings associated with adjacent vane stages of the compressor section, each annular ring being coupled to an associated plurality of vanes of each vane stage so as to control the associated plurality of variable vanes;

FIG. 6A is a top view of the vane adjustment assembly of FIG. 2, showing the first inclined plate and the second inclined plate arranged against the axially facing side of the annular ring via the fasteners and nuts;

FIG. 7 is a top view of the vane adjustment assembly of FIG. 6A, showing the second inclined plate slid in a first circumferential direction so as to adjust the roller pin position in a circumferential and axial direction;

FIG. 8 is a top view of the vane adjustment assembly of FIG. 7, showing the first inclined plate slid in a second circumferential direction opposite the first circumferential direction so as to further adjust the roller pin position in the axial direction;

FIG. 9A is a top view of the vane adjustment assembly of FIG. 6A, showing that the first inclined plate can be fixedly coupled to the annular ring;

FIG. 10 is a top view of the a vane adjustment assembly according to a further aspect of the present disclosure, showing that the assembly includes an annular ring and a ring adjustment assembly arranged on the annular ring, the ring adjustment assembly including a first inclined plate and a second inclined plate having a roller pin coupled thereto, the second inclined plate having an inclined surface slidable along an inclined surface of the first inclined plate such that sliding of the two plates along the inclined surfaces adjusts a circumferential and axial position of the roller pin, and showing that the first inclined plate is spaced apart from the annular ring via spacers.

DETAILED DESCRIPTION OF THE DRAWINGS

Figure 1:
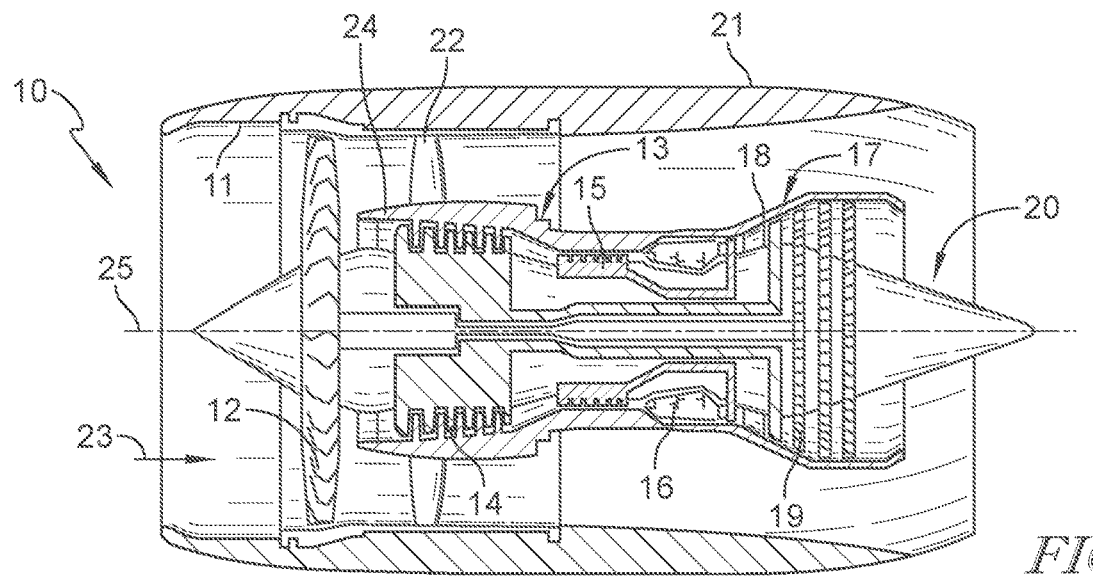
FIG. 1 is a cutaway view of a gas turbine engine with which a vane adjustment assembly according to the present disclosure may be utilized, showing that the gas turbine engine includes a propulsive fan, an engine core including a compressor, a combustor, and a turbine configured to drive the first propulsive fan, and a bypass duct surrounding the engine core.

For the purposes of promoting an understanding of the principles of the disclosure, reference will now be made to a number of illustrative embodiments illustrated in the drawings and specific language will be used to describe the same.

The present disclosure is related to a vane adjustment assembly 36 configured to be utilized in a gas turbine engine 10, in particular a vane adjustment assembly 36 including a ring adjustment assembly 40 arranged on an annular ring 30 that is coupled to a plurality of variable vanes 26. The ring adjustment assembly 40 includes a first inclined plate 42 having an inclined surface 43, also referred to as a second plate surface 43, a second inclined plate 52 having an inclined surface 53, also referred to as a first plate surface 53, facing and engaged with the first inclined plate 42 inclined surface 43 so as to slide along the first inclined plate 42, and a roller pin 80 coupled to a second plate surface 56 of the second inclined plate 52. Adjustment of the inclined plates 42, 52 relative to each other adjusts a circumferential and axial position of the roller pin 80. A person skilled in the art will understand that the disclosed vane adjustment assembly 36 or any related vane adjustment assemblies may be utilized in any type of engine similar to a gas turbine engine or any turbomachinery including vanes.

A vane adjustment assembly 36 according to a first aspect of the present disclosure is shown in FIGS. 2 and 4A-9. In an illustrative embodiment, the vane adjustment assembly 36 is configured to be utilized in a turbofan gas turbine engine 10, as shown in FIG. 1. The exemplary gas turbine engine 10 includes an inlet 11, a fan 12, an engine core including a compressor 13 having an inter-stage compressor section 14 and a compressor discharge section 15, a combustor 16, and a turbine 17 having a high-pressure turbine 18 and a low-pressure turbine 19. The fan 12 is driven by the turbine 17 and provides thrust for forwardly propelling an aircraft on which the gas turbine engine 10 is coupled. The compressor 13 compresses and delivers air 23 to the combustor 16. The combustor 16 mixes fuel with the compressed air 23 received from the compressor 13 and ignites the fuel. The hot, high-pressure products of the combustion reaction in the combustor 16 are directed into the turbine 17 to cause the turbine 17 to rotate about an axis 25 of the gas turbine engine 10 and drive the compressor 13 and the fan 12 and exhaust remaining mixture out of the turbine 17 over an exhaust plug 20. The engine 10 may include a nacelle 21 that houses the engine components described above.

The engine 10 includes a casing 24, which may be formed as a single component or multiple conjoined components, that surrounds the various sections of the engine 10, including the compressor 13, the combustor 16, and the turbine 17. Illustratively, the compressor 13 and/or turbine 17 sections may include multiple stages of a plurality of vanes 26 arranged between stages of bladed rotors, as shown in FIG. 3A. In an exemplary embodiment, the compressor section 13 of the engine 10 may include multiple stages, in particular five stages as shown in FIG. 3A, of pluralities of vanes 26, each surrounded by an annular ring 30.

Figure 3B:
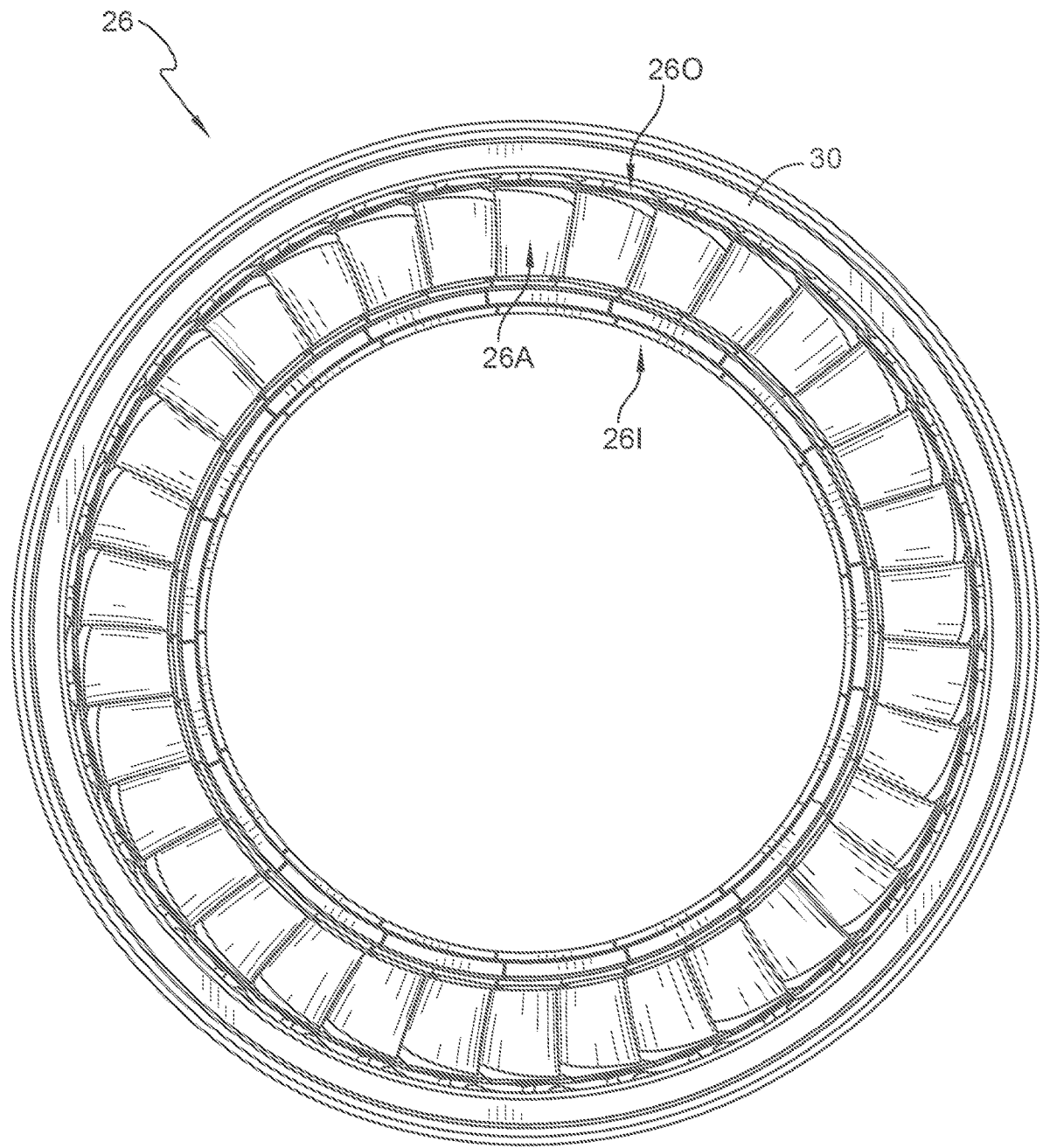
FIG. 3B is a front view of a plurality of vanes of a vane stage of the vane assembly of FIG. 3A.

In some embodiments, the plurality of vanes 26 include individual vane airfoils 26A having inner and outer platforms 261, 260, as shown in FIG. 3B. The plurality of vanes 26 may be surrounded by an annular ring 30. At least some or all of the vanes of the plurality of vanes 26 in some or all of the stages described above may be variable vanes that are configured to rotate so as to selectively redirect incoming air exiting an axially forward bladed rotor and subsequently onto other components of the engine 10.

In the illustrative embodiment, the vane adjustment assembly 36 is configured to be utilized in the compressor or turbine sections 13, 17 of the engine 10, although in other embodiments, a person skilled in the art could envision the adjustment assembly 36, or any other vane assemblies described herein, being utilized in other sections of the engine 10, such as with variable fan outlet guide vanes 22 arranged downstream of the fan 12 or inlet guide vanes arranged upstream of the fan 12.

Figure 3C:
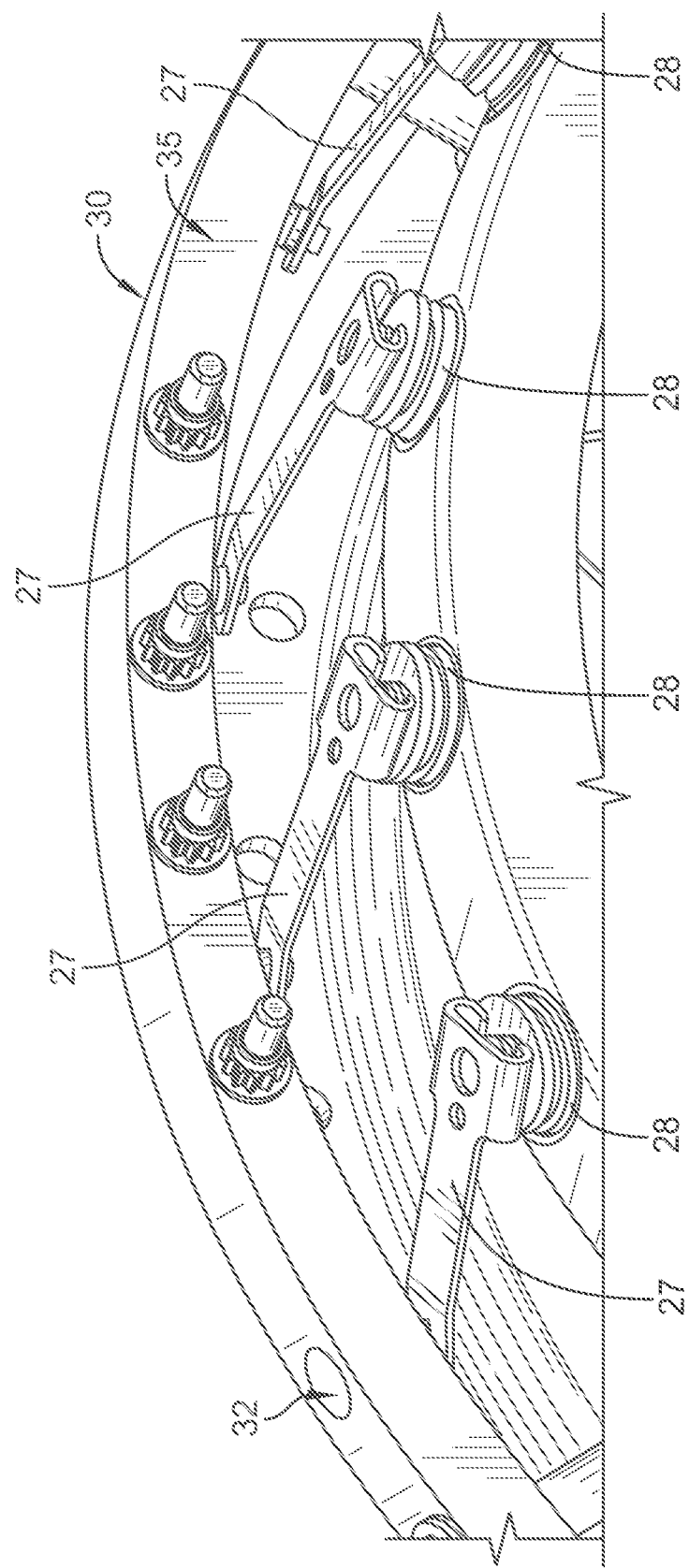
FIG. 3C is a perspective view of the annular ring and plurality of vanes on which the vane adjustment assembly of FIG. 2 is arranged, showing the annular ring coupled to each vane of the plurality of vanes via an actuator lever and a bearing coupled to a radially outer end of the vane.

FIG. 3C shows a perspective view of the annular ring 30, in particular the axially facing surface 35 of the annular ring 30 on which the vane adjustment assembly 36 can be arranged. In other embodiments, the assembly may be arranged on the axially facing surface of the annular ring 30 opposite the axially facing surface 35. The annular ring 30 can be coupled to each vane of the plurality of vanes 26 via an actuator lever 27 that is rotatably coupled to the annular ring 30 at an attachment hole 32 of the ring 30 and a bearing 28 coupled to a radially outer end of the vane. Movement of the annular ring 30, in particular circumferentially or axially, will affect the positioning of the plurality of vanes 26. In some embodiments, the rings 30 and vanes 26 are moved as the engine power and operating environment changes, such as between take-off, cruise, landing, etc. or between different temperatures, altitudes, pressures, etc.

Illustratively, the annular ring 30 is formed as a fully annular ring that is movably or slidably arranged relative to the casing 24 so as to rotate annularly relative thereto, as shown in FIG. 3A. The annular ring 30 may be formed as a single monolithic component, or may be formed in sections that are coupled together to form the fully annular ring 30. As can be seen in FIG. 3A and FIG. 3B, the annular ring 30 is arranged axially aft relative to the plurality of vanes 26, although a person skilled in the art will understand that, in other embodiments, the ring 30 may be arranged axially forward of the plurality of vanes 26. In some embodiments, the annular ring 30 is coaxial with the plurality of vanes 26, and more specifically, with the central axis 25.

Figure 3D:
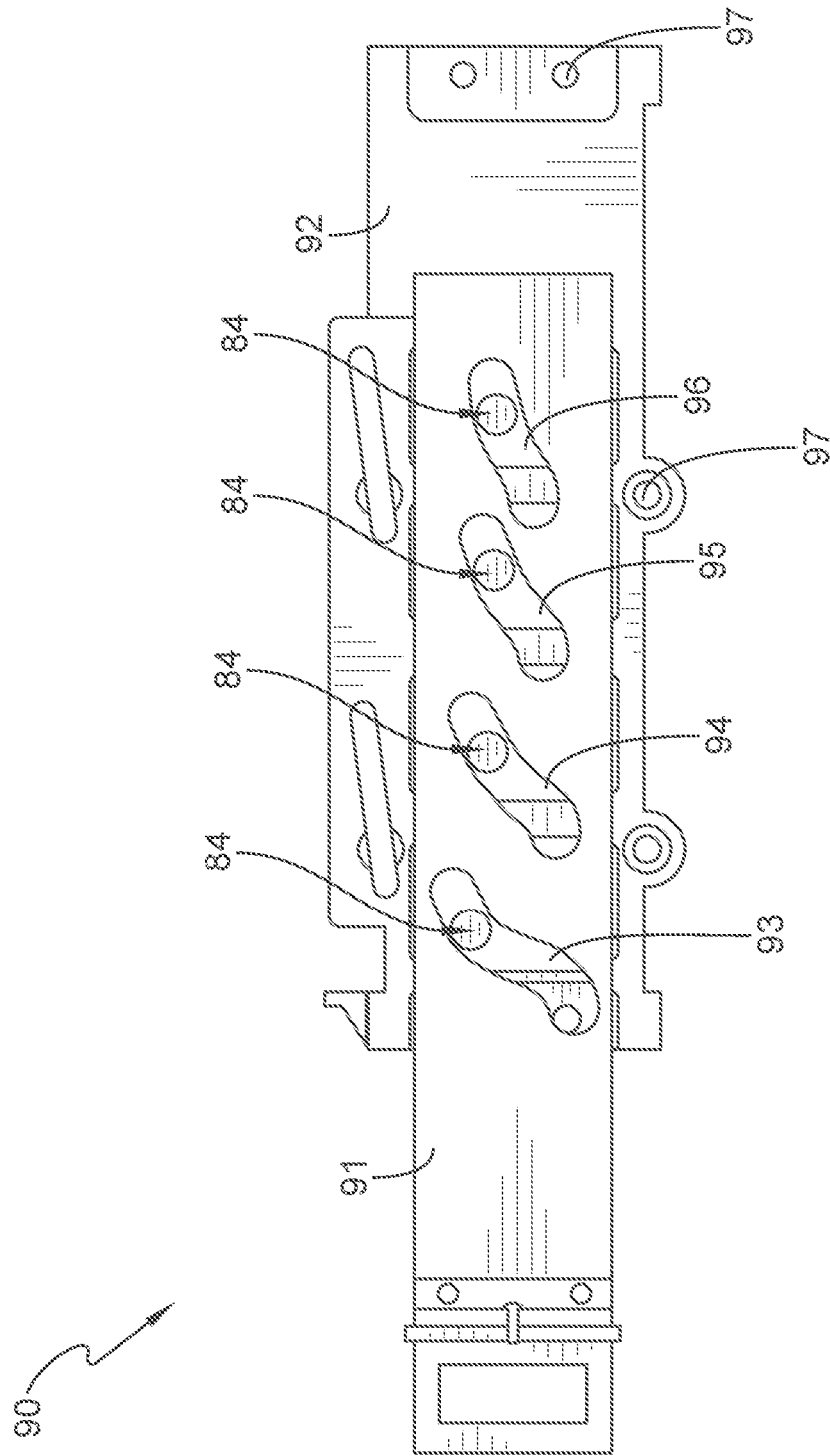
FIG. 3D is a top view of a cam plate configured to slidably engage the roller pin of the vane adjustment assembly of FIG. 2, showing that the cam plate is slidable in the axial direction relative to the casing so as to move the roller pins within slots formed in the cam plate.

As shown in FIG. 3D, a cam plate assembly 90 may be utilized to movably couple the vane adjustment assembly 36 to the casing 24. The cam plate assembly 90 includes a slidable cam plate 91 and a stationary support plate 92 fixedly coupled to the casing 24 at fastening points 97. The cam plate 91 may be slidably coupled to the support plate 92 either on a radially outer side of the support plate 92, as shown in FIG. 3D, or on a radially inner side of the support plate 92.

The cam plate 91 includes a plurality of slots 93, 94, 95, 96 which, when the cam plate 91 is arranged on the support plate 92, are aligned with the individual vane stages, for example, shown in FIG. 3A. The roller pin 80 of the vane adjustment assembly 36 of each vane stage is slidably arranged within each the corresponding slot 93, 94, 95, 96 via a roller pin head 84. The slots 93, 94, 95, 96 may be include the same or varying elongated shapes configured provide the same or differing movement paths for the roller pin heads 84 engage the roller pin head 84 of the vane adjustment assembly 36. In operation, the cam plate 91 can be moved in the axial direction relative to the stationary support plate 92, and thus relative to the casing 24, so as to move the roller pin heads 84 within the slots 93, 94, 95, 96 and thus along the specific paths defined by the slots 93, 94, 95, 96. The movement of the roller pin heads 84 will in turn move the annular ring 30 that is coupled to the roller pins 80 via the vane adjustment assembly 36.

With the cam plate 91, the roller pin 80 of the vane adjustment assembly 36 may be moved to a plurality of distinct roller pin positions that each correspond to distinct positions of the roller pin 80 relative to the casing 24. Moreover, due to the roller pin 80 being coupled to the annular ring 30 via the second inclined plate 52, the movement of the roller pin 80 relative to the casing 24 via the cam plate 91 will also affect the positioning of the annular ring 30 relative to the casing 24.

In order to further fine-tune and adjust the positioning of the plurality of vanes 26 via the positioning of the annular ring 30, the vane adjustment assembly 36 further includes the ring adjustment assembly 40 shown in FIGS. 2 and 4A-9. Illustratively, the ring adjustment assembly 40 includes a first inclined plate 42 arranged on the annular ring 30, a second inclined plate 52 arranged on the first inclined plate 42 and slidable thereto, the second inclined plate 52 having the roller pin 80 fixedly coupled thereto.

Figure 2:
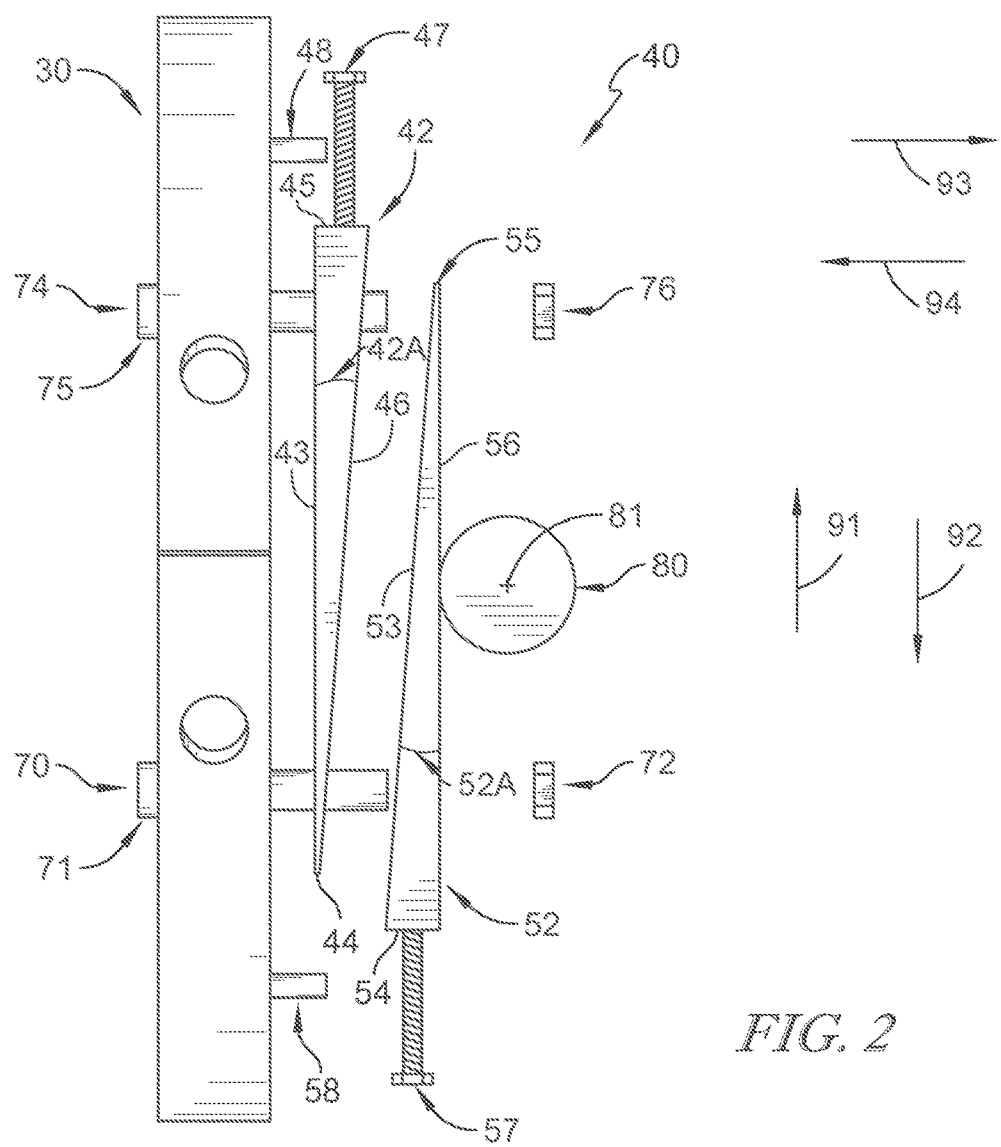
FIG. 2 is an exploded top view of a vane adjustment assembly according to the present disclosure, showing that the assembly includes an annular ring and a ring adjustment assembly arranged on the annular ring, the ring adjustment assembly including a first inclined plate and a second inclined plate having a roller pin coupled thereto, the second inclined plate having an inclined surface slidable along an inclined surface of the first inclined plate such that sliding of the two plates along the inclined surfaces adjusts a circumferential and axial position of the roller pin.

As can be seen in FIG. 2, the first inclined plate 42 includes a first plate surface 43, a first circumferential end 44, a second circumferential end 45 opposite the first circumferential end 44, and a second plate surface 46 opposite the first plate surface 43. The first plate surface 43 is generally planar such that the surface 43 can slide along the axially facing surface 35 of the annular ring 30 or, in other embodiments, so that the surface 43 can be fixedly arranged on the axially facing surface 35 of the annular ring 30.

The second plate surface 46 is inclined in a first circumferential direction 91, or in other words, the axial thickness of the first circumferential end 44 is smaller than the axial thickness of the second circumferential end 45, as shown in FIGS. 2, 6A, and 7-9A. In some embodiments, the angle 42A of the incline is in a range of 5 degrees to 30 degrees, and in some embodiments, in a range of 10 degrees to 25 degrees, and in some embodiments, in a range of 15 degrees to 20 degrees. In some embodiments, the angle 42A may be approximately 17.5 degrees. The second plate surface 46 is also formed to be generally planar such that the first plate surface 53 of the second inclined plate 56 can slide thereon.

Figure 5A:
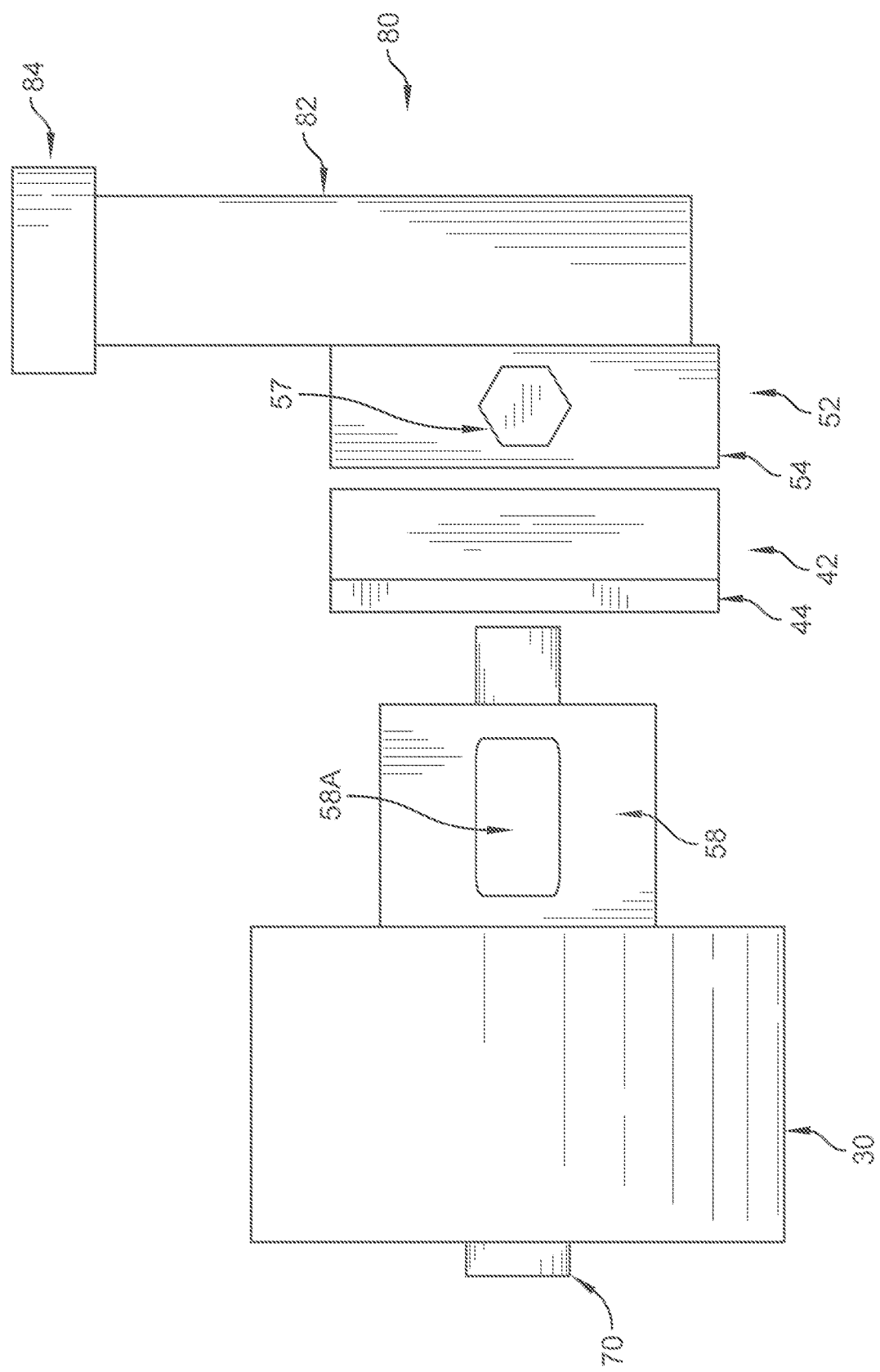
FIG. 5A is a side view of the vane adjustment assembly of FIG. 2.
Figure 5B:
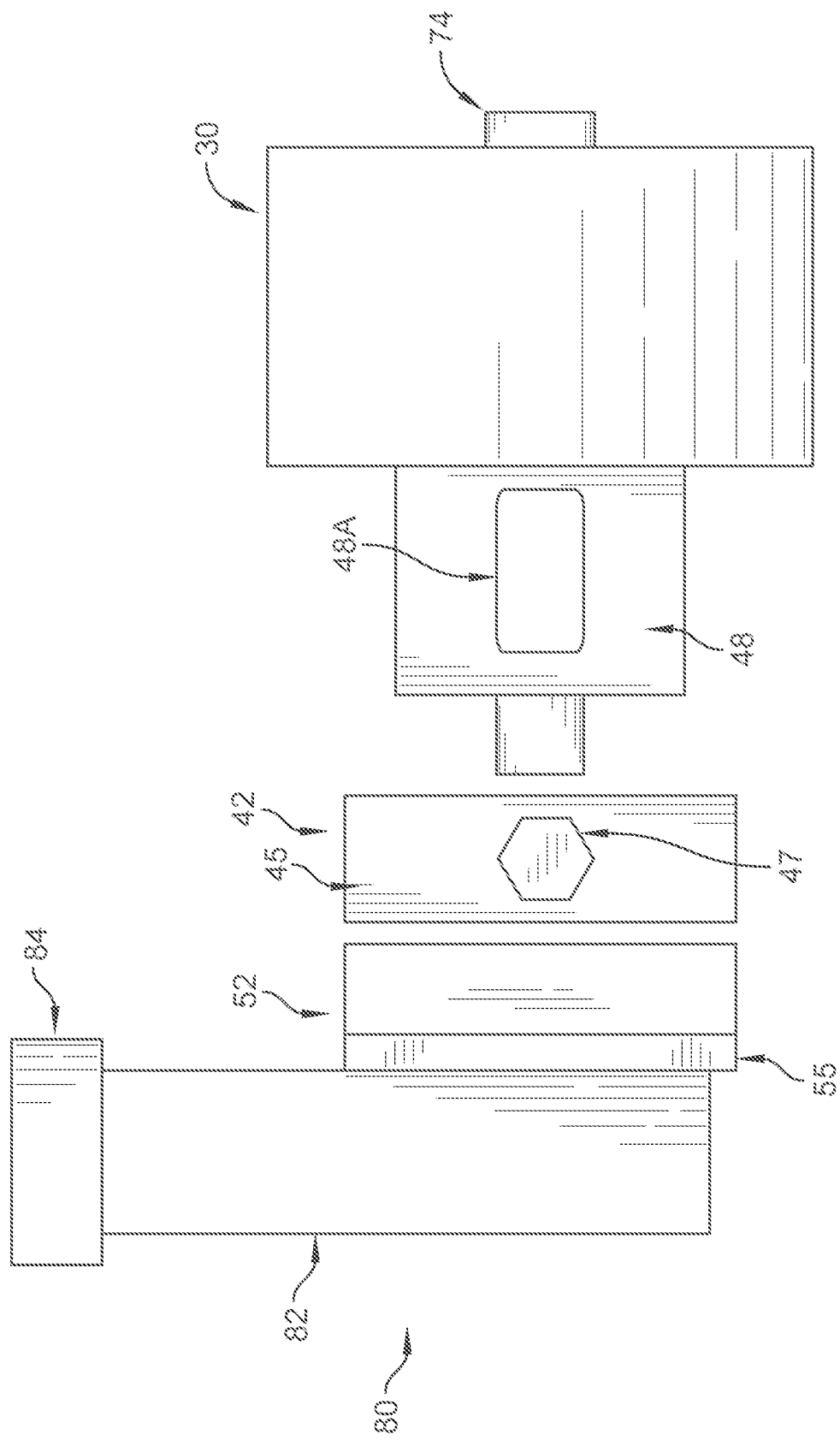
FIG. 5B is a side view of the vane adjustment assembly of FIG. 2 opposite the view direction of FIG. 5A.
Figure 6B:
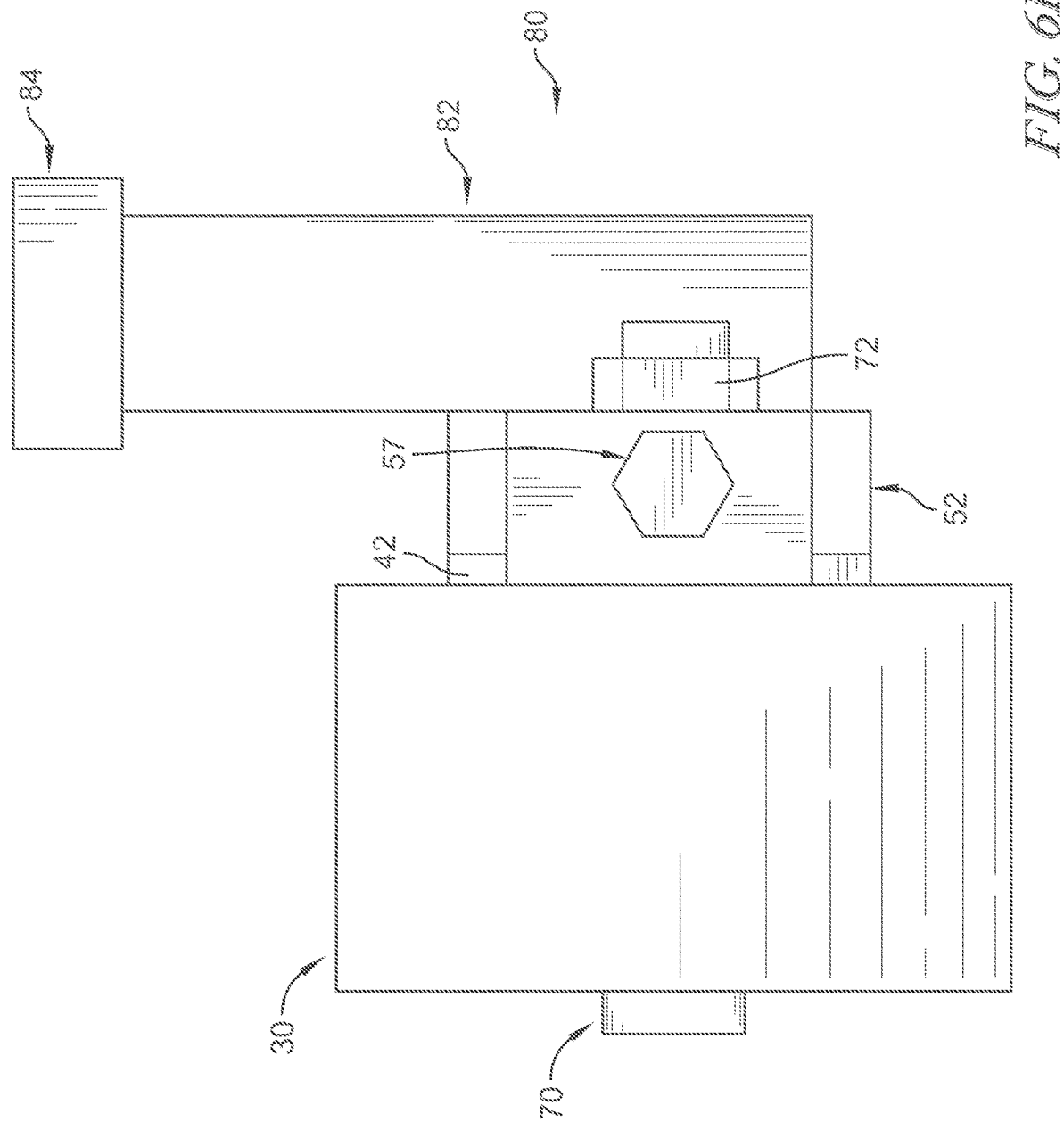
FIG. 6B is a side view of the vane adjustment assembly of FIG. 6A.
Figure 6C:
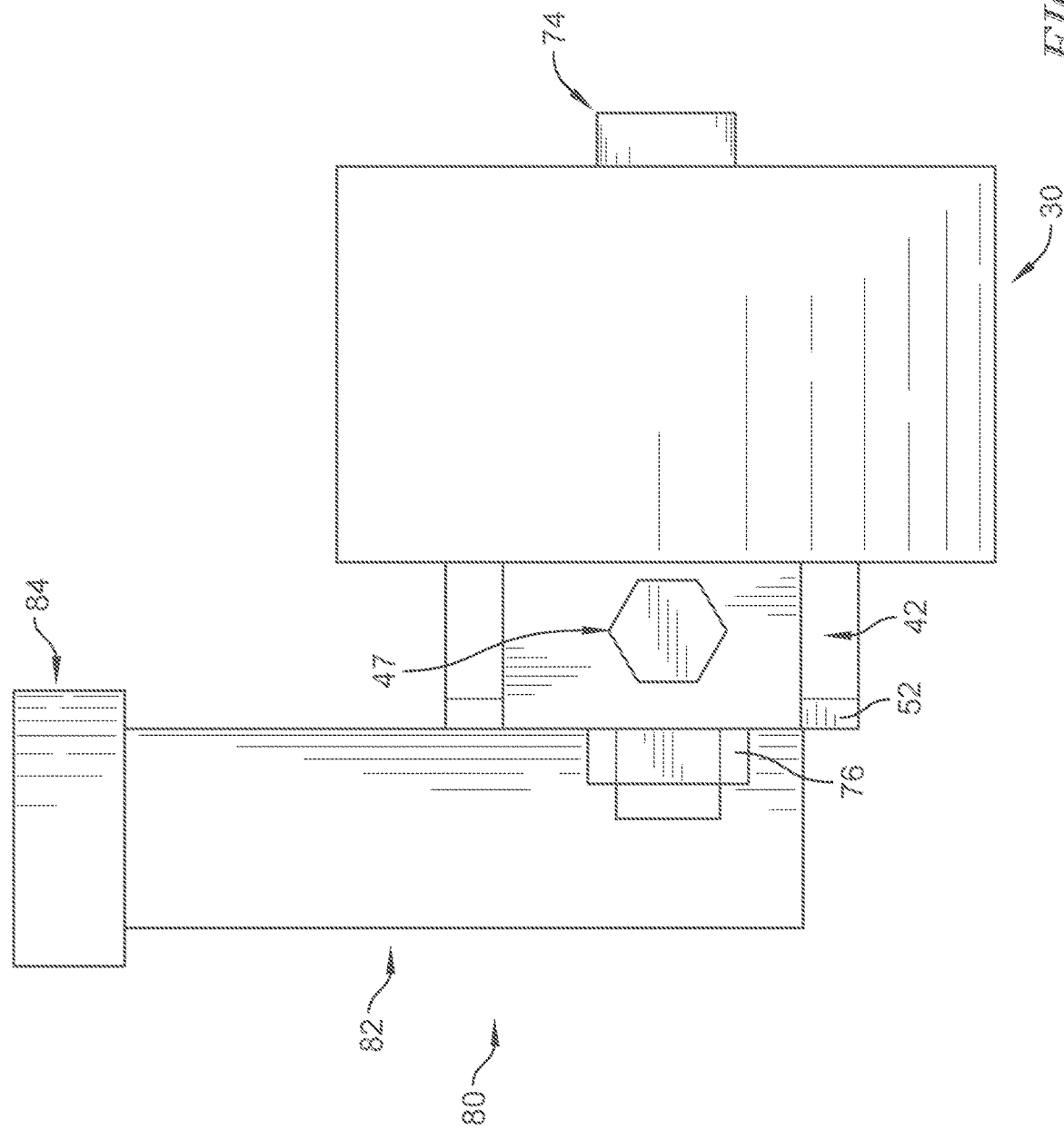
FIG. 6C is a side view of the vane adjustment assembly of FIG. 6A.

Illustratively, the first inclined plate 42 includes a threaded screw 47 rotatably secured to the second circumferential side 45 and extending away from the second circumferential side 45, as shown in FIGS. 2, 6A, 7, and 8. A first plate support member 48 may extend axially away from the axially facing surface 35 of the annular ring 30. The first plate support member 48 includes a threaded hole 48A extending therethrough in the circumferential direction, as shown in FIG. 5B. As can be seen in FIG. 6A, the threaded screw 47 of the first inclined plate 42 extends through and engages the threaded hole 48A of the first plate support member 48. The threaded screw 47 is configured to rotate relative to the first inclined plate 42 such that rotation of the threaded screw 47 within the hole 48A in a first rotational direction moves the first inclined plate 42 in one of the first and second circumferential directions 91, 92. For example, as shown in FIG. 8, rotation of the thread screw 47 in a first rotational direction moves the first inclined plate 42 in the first circumferential direction 91. Likewise, rotation of the thread screw 47 in a second, opposite rotational direction moves the first inclined plate 42 in the second circumferential direction 92.

The ring adjustment assembly 40 further includes fasteners 70, 74 extending axially through the annular ring 30, through the first inclined plate 42, and through the second inclined plate 52, as shown in FIGS. 2, 6A-9A, 10, and 11. The fasteners 70, 74 extend through openings 49 formed in the first inclined plate 42 and openings 59 formed in the second inclined plate 52 and extend beyond the second inclined plate 52 such that nuts 72, 76 may be fastened to the terminal ends of the fastener 70, 74 so as to secure the first inclined plate 42 and the second inclined plate 52 to the annular ring 30.

Figure 4A:
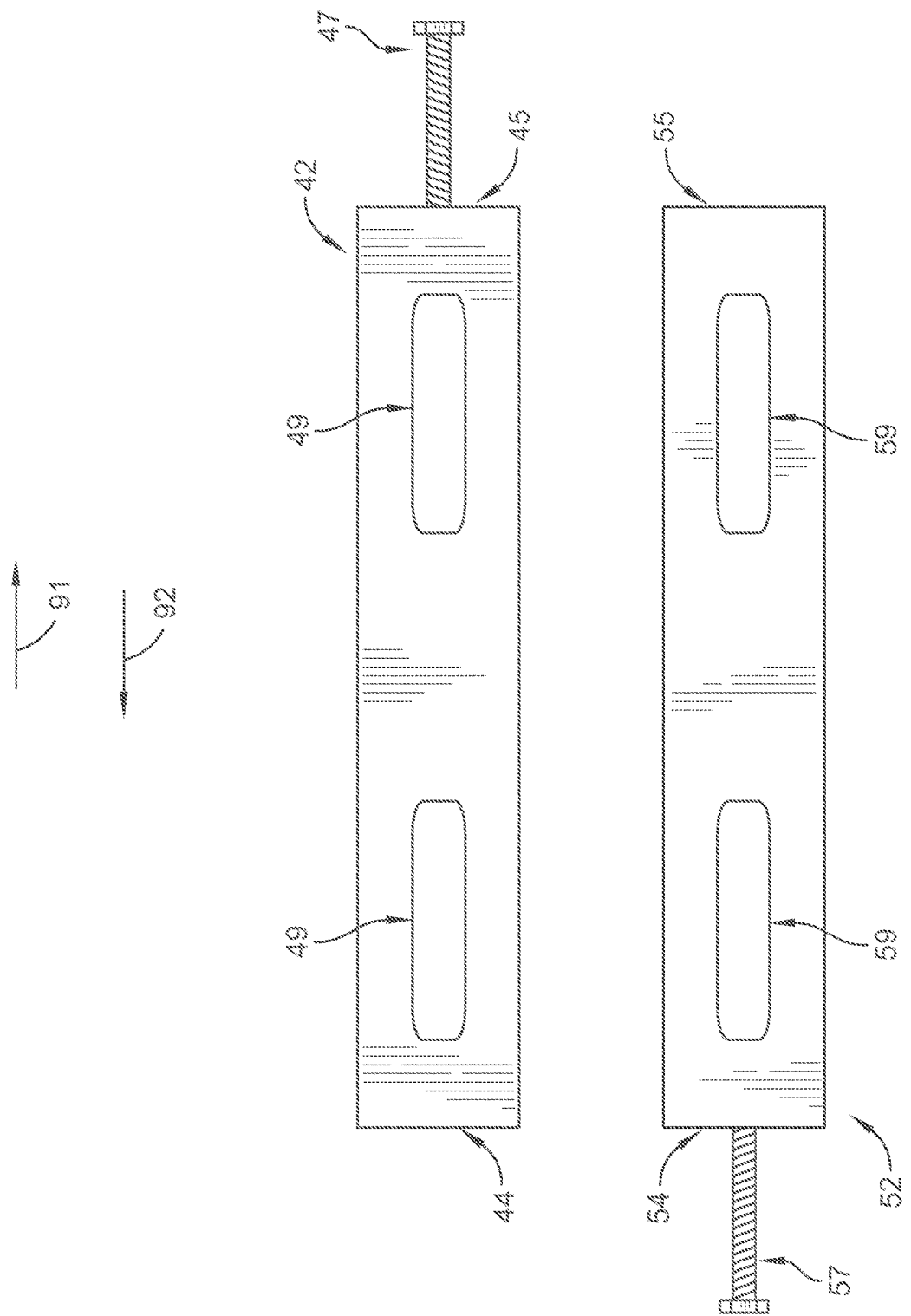
FIG. 4A is a rear view of the first and second inclined plates of the vane adjustment assembly of FIG. 2.
Figure 4B:
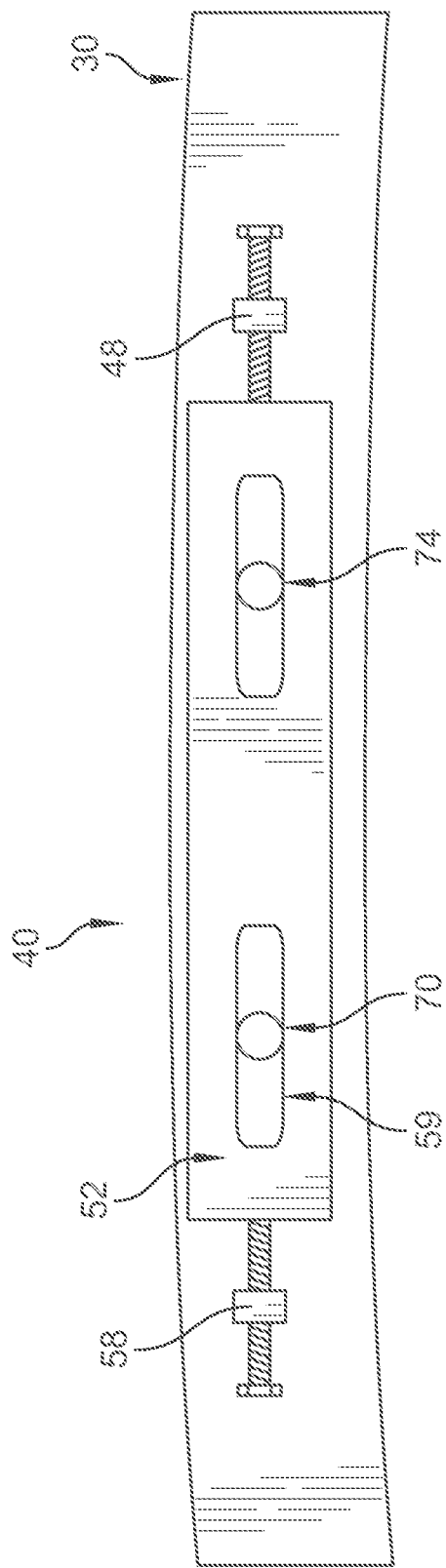
FIG. 4B is a rear view of the vane adjustment assembly of FIG. 2 arranged on an axial facing surface of the annular ring.

As can be seen in FIG. 4A, the first inclined plate 42 includes first and second elongated openings 49 formed therethrough. In some embodiments, the elongated openings 49 have a longitudinal extent that extends in the circumferential direction (first and second circumferential directions 91, 92) from the first circumferential side 44 to the second circumferential side 45. As described above, the fasteners 70, 74 extend through the elongated openings 49. Due to the elongated shape of the openings 49, the first inclined plate 42 can slide along the fasteners 70, 74 via the openings 49. In particular, the first and second elongated openings 49 of the first inclined plate 42 slide along the fasteners 70, 74 during adjustment of the first inclined plate 42 in the first and second circumferential directions 91, 92.

As can be seen in FIG. 2, the second inclined plate 52 is formed similarly to the first inclined plate 42. In particular, the second inclined plate 52 includes a first plate surface 53, a first circumferential end 54, a second circumferential end 55 opposite the first circumferential end 54, and a second plate surface 56 opposite the first plate surface 53. The second plate surface 56 is generally planar in some embodiments. The roller pin 80 is fixedly coupled to the second plate surface 56. Illustratively, the roller pin 80 is located generally centrally along a longitudinal extent of the second inclined plate 52. A person skilled in the art will understand that the roller pin 80 can be positioned at different longitudinal positions along the second inclined plate 52 based on the positioning requirements of the annular ring 30 and vanes 26.

The first plate surface 53 is inclined in the second circumferential direction 92, or in other words, the axial thickness of the second circumferential end 55 is smaller than the axial thickness of the first circumferential end 54, as shown in FIGS. 2, 6A, and 7-9A. In some embodiments, the angle 52A of the incline is in a range of 5 degrees to 30 degrees, and in some embodiments, in a range of 10 degrees to 25 degrees, and in some embodiments, in a range of 15 degrees to 20 degrees. In some embodiments, the angle 52A may be approximately 17.5 degrees. The first plate surface 53 is also formed to be generally planar such that the second plate surface 46 of the first inclined plate 42 can slide thereon.

In some embodiments, the angle 52A of the first plate surface 53 of the second inclined plate 52 is equal to the angle 42A of the second plate surface 46 of the first inclined plate 42, as shown in FIGS. 2 and 6A. In some embodiments, the angle 52A of the first plate surface 53 of the second inclined plate 52 is different than the angle 42A of the second plate surface 46 of the first inclined plate 42.

Illustratively, the second inclined plate 52 includes a threaded screw 57 rotatably secured to the first circumferential side 54 and extending away from the first circumferential side 54, as shown in FIGS. 2, 6A, 7, and 8. A second plate support member 58 may extend axially away from the axially facing surface 35 of the annular ring 30. The second plate support member 58 includes a threaded hole 58A extending therethrough in the circumferential direction, as shown in FIG. 5A. As can be seen in FIG. 6A, the threaded screw 57 of the second inclined plate 52 extends through and engages the threaded hole 58A of the second plate support member 58. The threaded screw 57 is configured to rotate relative to the second inclined plate 52 such that rotation of the threaded screw 57 within the hole 58A in a first rotational direction moves the second inclined plate 52 in one of the first and second circumferential directions 91, 92. For example, as shown in FIGS. 7 and 8, rotation of the thread screw 57 in a first rotational direction moves the second inclined plate 52 in the second circumferential direction 92. Likewise, rotation of the thread screw 57 in a second, opposite rotational direction moves the second inclined plate 52 in the first circumferential direction 91.

As can be seen in FIG. 4A, the second inclined plate 52 includes first and second elongated openings 59 formed therethrough. In some embodiments, the elongated openings 59 have a longitudinal extent that extends in the circumferential direction (first and second circumferential directions 91, 92) from the first circumferential side 54 to the second circumferential side 55. As described above, the fasteners 70, 74 extend through the elongated openings 59. Due to the elongated shape of the openings 59, the second inclined plate 52 can slide along the fasteners 70, 74 via the openings 59. In particular, the first and second elongated openings 59 of the second inclined plate 52 slide along the fasteners 70, 74 during adjustment of the second inclined plate 52 in the first and second circumferential directions 91, 92.

The roller pin 80 is coupled to the second surface 56 of the second inclined plate 52 and extends radially outward away from the plate 52, as shown in FIGS. 5A and 5B. The roller pin 80 may be formed as a cylinder 82 that extends upwardly and terminates at a roller pin head 84, which is located at a radially outer terminal end of the roller pin cylinder 82. As described above, the roller pin head 84 is configured to move within the slots 93, 94, 95, 96 formed in the cam plate 91. In some embodiments, the roller pin 80 is centrally aligned on the second surface 56.

In operation, the second inclined plate 52 is adjustable in the first and second circumferential directions 91, 92 such that the first plate surface 53 of the second inclined plate 52 slides along the second plate surface 46 of the first inclined plate 42 during adjustment of the second inclined plate 52 in the first and second circumferential directions 91, 92. As a result, both an axial position and a circumferential position of the roller pin 80 relative to the annular ring 30 is adjusted by the circumferential movement of the second inclined plate 52.

Similarly, the first inclined plate 42 is adjustable in the first and second circumferential directions 91, 92 such that the first plate surface 43 of the first inclined plate 42 slides along the axially facing surface 35 of the annular ring 30 and such that the second plate surface 46 of the first inclined plate 42 slides along the first plate surface 53 of the second inclined plate 52 during adjustment of the first inclined plate 42 in the first and second circumferential directions 91, 92. As a result, only an axial position of the roller pin 80 relative to the annular ring 30 is adjusted by the circumferential movement of the first inclined plate 42 due to the roller pin 80 only being coupled to the second inclined plate 52.

Each of the first and second inclined plates 42, 52 can be selectively adjusted via the threaded screws 47, 57 until the fasteners 70, 74 reach terminal ends of the elongated openings 49, 59. Illustratively, the first inclined plate 42 can be moved in the first circumferential direction 91 in order to decrease the axial distance (as measured in the axial directions 93, 94) between the roller pin 80 and the annular ring 30, and in the second circumferential direction 92 in order to increase the axial distance between the roller pin 80 and the annular ring 30. Similarly, the second inclined plate 52 can be moved in the second circumferential direction 92 in order to decrease the axial distance between the roller pin 80 and the annular ring 30 and to move the roller 80 in the second circumferential direction 92, and in the first circumferential direction 91 in order to increase the axial distance between the roller pin 80 and the annular ring 30 and to move the roller 80 in the first circumferential direction 91.

Figure 9B:
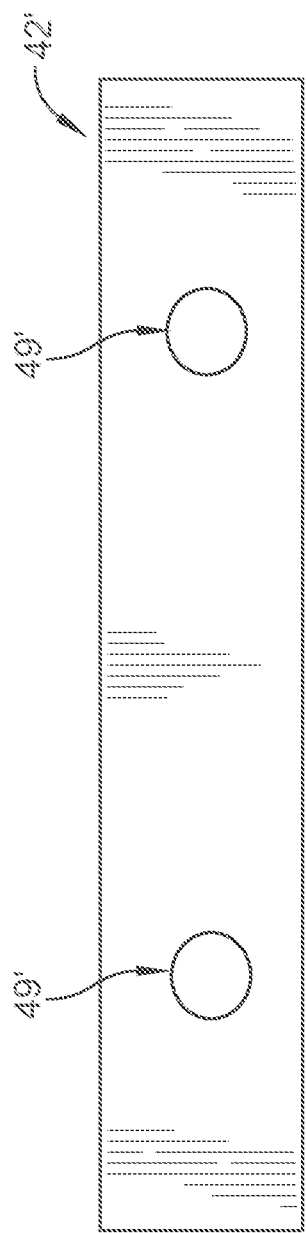
FIG. 9B is a rear view of the openings of the first inclined plate being circular.

In some embodiments, the first inclined plate 42' can be fixedly coupled to the axially facing surface 53 of the annular ring 30, as shown in FIG. 9A. In such embodiments, the first inclined plate 42' does not require the threaded screw 47, and the annular ring 30 does not require the first plate support member 48. As can be seen in FIG. 9B, the first inclined plate 42' may include circular holes 49', as the elongated holes described above are not required for circumferential movement of the plate 42'. As a result of the fixed coupling of the first inclined plate 42' to the annular ring 30, only the second inclined plate 52 is moved in the circumferential directions 91, 92. As such, only the circumferential movement of the second inclined plate 52 will adjust the circumferential and axial position of the roller pin 80.

Figure 11:
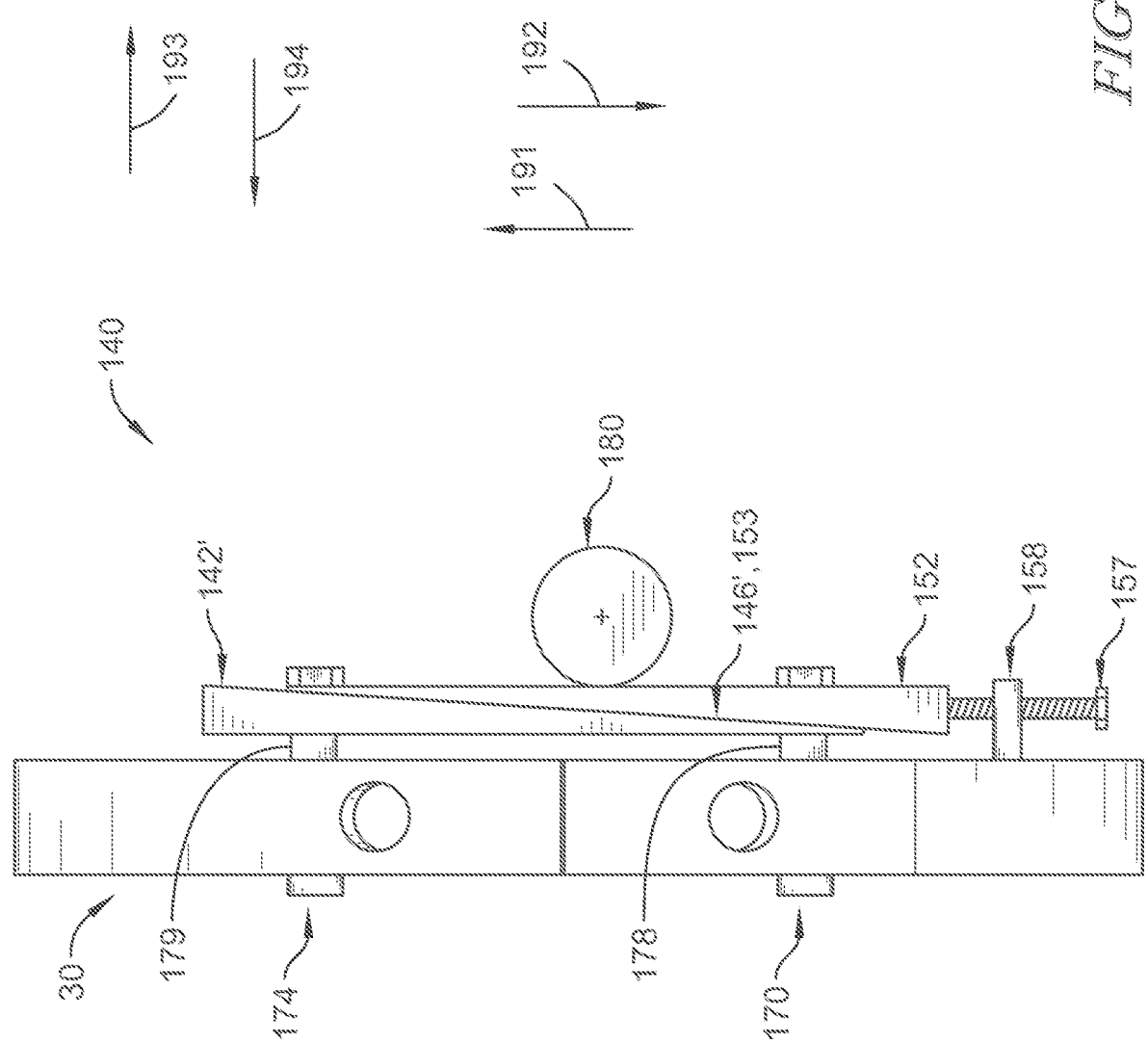
FIG. 11 is a top view of the vane adjustment assembly of FIG. 10, showing that the first inclined plate can be fixedly coupled to the spacers and thus to the annular ring.

Another embodiment of a vane adjustment assembly 136 that is configured to be utilized in the gas turbine engine 10 is shown in FIGS. 10 and 11. The vane adjustment assembly 136 is similar to the vane adjustment assembly 36 described herein. Accordingly, similar reference numbers in the 100 series indicate features that are common between the vane adjustment assembly 136 and the vane adjustment assembly 36. The description of the vane adjustment assembly 36 is incorporated by reference to apply to the vane adjustment assembly 136, except in instances when it conflicts with the specific description and the drawings of the vane adjustment assembly 136.

The vane adjustment assembly 136 is configured similarly to the vane adjustment assembly 36, in particular to include a ring adjustment assembly 140 including a first inclined plate 142 and a second inclined plate 152 with a roller pin 180 attached thereto. The ring adjustment assembly 140 differs from the ring adjustment assembly 40 in that the assembly 140 further includes spacers 178, 179 arranged between the first inclined plate 142 and the annular ring 130 so as to increase the axial distance (as measured in the axial directions 193, 194) between the roller pin 180 and the annular ring 30. The first and second plate support members 147, 157 extend further away from the annular ring 30 than the first and second plate support members 48, 58 described above so as to accommodate the additional axial distance between the first inclined plate 142 and the annular ring 30 due to the spacers 178, 179. In some embodiments, a variety of spacers can be provided in a kit, which can be swapped in and out of the assembly 136 in order to adjust the axial distance between the roller pin 180 and the annular ring 30. In some embodiments, as shown in FIG. 11, the first inclined plate 142' can be fixedly coupled to the annular ring 30 similar to the first inclined plate 42' described above.

A method of adjusting a position of a plurality of variable vanes of a gas turbine engine according to a further aspect of the present disclosure includes arranging the plurality of variable vanes around a central axis of the gas turbine engine, arranging an annular ring radially outward of the central axis, and coupling the annular ring to the plurality of variable vanes. The method can further include arranging a first inclined plate having a first surface that is inclined in a first circumferential direction on an axial surface of the annular ring, and arranging a second inclined plate on the first surface of the first inclined plate, the second inclined plate having a second surface contacting the first surface that is inclined in a second circumferential direction opposite the first circumferential direction, the second inclined plate including a roller pin coupled thereto, The second inclined plate can be adjustable in the first and second circumferential directions such that the first surface is configured to slide along the second surface during adjustment of the second inclined plate so as to adjust an axial position and a circumferential position of the roller pin relative to the annular ring.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A vane adjustment assembly for a gas turbine engine, comprising a plurality of vanes extending radially outward relative to a central axis of the gas turbine engine,
   an annular ring arranged radially outward of the central axis and coupled to the plurality of vanes, and
   a ring adjustment assembly including (i) a first inclined plate having a first plate surface arranged on an axially facing surface of the annular ring and a second plate surface opposite the first plate surface that is inclined in a first circumferential direction, (ii) a second inclined plate having a first plate surface arranged on the second plate surface of the first inclined plate and a second plate surface opposite the first plate surface of the second inclined plate, the first plate surface of the second inclined plate being inclined in a second circumferential direction opposite the first circumferential direction, and (iii) a roller pin coupled to the second plate surface of the second inclined plate,
   wherein the second inclined plate is adjustable in the first and second circumferential directions such that the first plate surface of the second inclined plate is configured to slide along the second plate surface of the first inclined plate during adjustment of the second inclined plate so as to adjust an axial position and a circumferential position of the roller pin relative to the annular ring.

2. The vane adjustment assembly of claim 1, wherein the ring adjustment assembly further includes a first fastener extending axially through the annular ring, through the first inclined plate, and through the second inclined plate.

3. The vane adjustment assembly of claim 2, wherein the second inclined plate includes a first elongated opening formed therethrough, wherein the first elongated opening has a longitudinal extent that extends in a circumferential direction from a first circumferential side of the second inclined plate to a second circumferential side of the second inclined plate, and wherein the first fastener extends through the first elongated opening.

4. The vane adjustment assembly of claim 3, wherein the first fastener is slidable within the first elongated opening such that the first elongated opening of the second inclined plate slides along the first fastener during adjustment of the second inclined plate in the first and second circumferential directions.

5. The vane adjustment assembly of claim 3, wherein the first circumferential side of the second inclined plate is thicker in an axial direction relative to the annular ring than the second circumferential side of the second inclined plate such that the second inclined plate is inclined in the second circumferential direction from the second circumferential side to the first circumferential side.

6. The vane adjustment assembly of claim 5, wherein the annular ring includes a second plate support member extending axially away from the axially facing surface of the annular ring and that includes a threaded hole extending circumferentially therethrough, wherein the second inclined plate includes a threaded screw extending away from the first circumferential side that extends through and engages the threaded hole of the second plate support member, and wherein rotation of the threaded screw in a first rotational direction moves the second inclined plate in one of the first and second circumferential directions.

7. The vane adjustment assembly of claim 6, wherein the first inclined plate is fixedly coupled to the annular ring.

8. The vane adjustment assembly of claim 6, wherein the ring adjustment assembly further includes a spacer arranged between the first inclined plate and the annular ring so as to increase an axial distance between the roller pin and the annular ring.

9. The vane adjustment assembly of claim 1, wherein the first inclined plate is adjustable in the first and second circumferential directions such that the second plate surface of the first inclined plate is configured to slide along the first plate surface of the second inclined plate during adjustment of the first inclined plate so as to further adjust the axial position of the roller pin relative to the annular ring.

10. The vane adjustment assembly of claim 9, wherein a first circumferential side of the first inclined plate is thinner in an axial direction relative to the annular ring than a second circumferential side of the first inclined plate such that the first inclined plate is inclined in the first circumferential direction from the first circumferential side to the second circumferential side.

11. The vane adjustment assembly of claim 10, wherein the annular ring further includes a first plate support member extending axially away from the axially facing surface of the annular ring and that includes a threaded hole extending circumferentially therethrough, wherein the first inclined plate includes a threaded screw extending away from the second circumferential side that extends through and engages the threaded hole of the first plate support member, and wherein rotation of the threaded screw in a first rotational direction moves the first inclined plate in one of the first and second circumferential directions.

12. The vane adjustment assembly of claim 1, wherein the roller pin is selectively movably coupled to a casing of the gas turbine engine such that movement of the roller pin relative to the casing further adjusts a position of the annular ring relative to the casing, wherein the roller pin is selectively movably coupled to the casing via a cam plate that is slidably coupled to the casing and slidable relative to the casing, and wherein the cam plate includes at least one slot within which the roller pin is slidably arranged.

13. The vane adjustment assembly of claim 12, wherein sliding of the cam plate relative to the casing in an axial direction causes the roller pin to slidably move within the at least one slot and further adjusts the position of the annular ring relative to the casing, and wherein the roller pin includes a roller pin head configured to be slidably arranged within the at least one slot and engage with edges of the at least one slot.

14. A vane adjustment assembly for a gas turbine engine, comprising
   an annular ring arranged radially outward of a central axis of the gas turbine engine and coupled to a plurality of variable vanes, and
   a ring adjustment assembly including (i) a first inclined plate having a first surface that is inclined in a first circumferential direction, (ii) a second inclined plate having a second surface facing the first surface that is inclined in a second circumferential direction opposite the first circumferential direction, and (iii) a roller pin coupled to the second inclined plate,
   wherein the second inclined plate is adjustable in the first and second circumferential directions such that the first surface is configured to slide along the second surface during adjustment of the second inclined plate so as to adjust an axial position and a circumferential position of the roller pin relative to the annular ring.

15. The vane adjustment assembly of claim 14, wherein the ring adjustment assembly further includes a first fastener extending axially through the annular ring, through the first inclined plate, and through the second inclined plate.

16. The vane adjustment assembly of claim 15, wherein the second inclined plate includes a first elongated opening formed therethrough, wherein the first elongated opening has a longitudinal extent that extends in a circumferential direction from a first circumferential side of the second inclined plate to a second circumferential side of the second inclined plate, and wherein the first fastener extends through the first elongated opening.

17. The vane adjustment assembly of claim 16, wherein the first fastener is slidable within the first elongated opening such that the first elongated opening of the second inclined plate slides along the first fastener during adjustment of the second inclined plate in the first and second circumferential directions.

18. The vane adjustment assembly of claim 16, wherein the first circumferential side of the second inclined plate is thicker in an axial direction relative to the annular ring than the second circumferential side of the second inclined plate such that the second inclined plate is inclined in the second circumferential direction from the second circumferential side to the first circumferential side.

19. The vane adjustment assembly of claim 18, wherein the annular ring includes a second plate support member extending axially away from an axially facing surface of the annular ring and that includes a threaded hole extending circumferentially therethrough, wherein the second inclined plate includes a threaded screw extending away from the first circumferential side that extends through and engages the threaded hole of the second plate support member, and wherein rotation of the threaded screw in a first rotational direction moves the second inclined plate in one of the first and second circumferential directions.

20. A method of adjusting a position of a plurality of variable vanes of a gas turbine engine, comprising
   arranging the plurality of variable vanes around a central axis of the gas turbine engine,
   arranging an annular ring radially outward of the central axis,
   coupling the annular ring to the plurality of variable vanes,
   arranging a first inclined plate having a first surface that is inclined in a first circumferential direction on an axial surface of the annular ring, and
   arranging a second inclined plate on the first surface of the first inclined plate, the second inclined plate having a second surface contacting the first surface that is inclined in a second circumferential direction opposite the first circumferential direction, the second inclined plate including a roller pin coupled thereto,
   wherein the second inclined plate is adjustable in the first and second circumferential directions such that the first surface is configured to slide along the second surface during adjustment of the second inclined plate so as to adjust an axial position and a circumferential position of the roller pin relative to the annular ring.

* * * * *